(12) United States Patent
Gottfried et al.

(10) Patent No.: US 11,739,880 B2
(45) Date of Patent: Aug. 29, 2023

(54) HIGH TEMPERATURE PROTECTION WRAP FOR PLASTIC PIPES AND PIPE APPLIANCES

(71) Applicants: Samuel Gottfried, Riverdale, NY (US); Alfredo De Angelis, New York, NY (US)

(72) Inventors: Samuel Gottfried, Riverdale, NY (US); Alfredo De Angelis, New York, NY (US)

( * ) Notice: Subject to any disclaimer, the term of this patent is extended or adjusted under 35 U.S.C. 154(b) by 0 days.

(21) Appl. No.: 17/746,109

(22) Filed: May 17, 2022

(65) Prior Publication Data

US 2022/0373125 A1    Nov. 24, 2022

Related U.S. Application Data

(60) Provisional application No. 63/190,284, filed on May 19, 2021.

(51) Int. Cl.
| | |
|---|---|
| *F16L 11/00* | (2006.01) |
| *F16L 59/16* | (2006.01) |
| *F16L 59/02* | (2006.01) |

(52) U.S. Cl.
CPC ............ *F16L 59/16* (2013.01); *F16L 59/021* (2013.01); *F16L 59/028* (2013.01); *F16L 59/029* (2013.01)

(58) Field of Classification Search
CPC ........ F16L 59/16; F16L 59/021; F16L 59/028
USPC .......................................... 138/110, 128, 137
See application file for complete search history.

(56) References Cited

U.S. PATENT DOCUMENTS

| | | |
|---|---|---|
| 4,028,330 A | 6/1977 | King |
| 4,128,434 A | 12/1978 | Pusch |
| 4,251,590 A | 2/1981 | Rubright et al. |
| 4,289,687 A | 9/1981 | Hagiwara |
| 4,388,429 A | 6/1983 | Ilardo et al. |
| 4,466,990 A | 8/1984 | Sakurada et al. |
| 4,553,308 A | 11/1985 | Botsolas |
| 4,573,862 A | 2/1986 | Ellis |
| 4,879,320 A | 11/1989 | Hastings |
| 4,992,481 A | 2/1991 | Von Bonin |
| 5,119,746 A | 6/1992 | Nishikawa et al. |
| 5,173,960 A | 12/1992 | Dickinson |
| 5,329,972 A | 7/1994 | Guiton |

(Continued)

*Primary Examiner* — James F Hook
(74) *Attorney, Agent, or Firm* — Anthony Morano; Ezra Sutton

(57) ABSTRACT

A concentric, multi-layer laminated wrap for protection of plastic pipes including up to 60-minute fire endurance, low flame spread, low smoke, and toxic products of combustion. The laminated wrap can withstand temperatures up to 2000° F. for up to a period of 60 minutes. The concentric laminated wrap includes an inner support layer that provides strength, an intermediate fire protective coating layer that provides fire, heat, and high temperature protection, and an outer top coating layer that provides resistance to abrasion, impact, and environmental factors including water, salt water, hydrocarbons, chemicals, and gases. The protection to plastic pipes and pipe appliances is provided by the fire protective coating layer that is applied directly to the pipe or as a layer in the laminated wrap around the pipe. The present invention is disclosed for fire, heat, and high temperature protection of pipes, including linear pipes and pipe appliances such as flanges, couplings, valves, joints, tees, and bends.

12 Claims, 2 Drawing Sheets

(56) References Cited

U.S. PATENT DOCUMENTS

| | | |
|---|---|---|
| 5,466,528 A | 11/1995 | Girgis |
| 5,476,891 A | 12/1995 | Welna |
| 5,562,957 A | 10/1996 | Hilden |
| 5,572,940 A | 11/1996 | Burton et al. |
| 5,658,972 A | 8/1997 | Grzybowski et al. |
| 5,723,515 A | 3/1998 | Gottfried |
| 5,851,663 A | 12/1998 | Parsons |
| 5,888,339 A | 3/1999 | Hanson |
| 5,913,607 A | 6/1999 | Lengyel, Sr. |
| 5,985,385 A | 11/1999 | Gottfried |
| 6,074,714 A | 6/2000 | Gottfried |
| 6,236,791 B1 | 5/2001 | Lausch |
| 6,322,873 B1 | 11/2001 | Orologio |
| 6,329,451 B2 | 12/2001 | Matsumoto et al. |
| 6,348,122 B1 | 2/2002 | Wagner |
| 6,363,197 B1 | 3/2002 | Zarian |
| 6,534,601 B1 | 3/2003 | Park et al. |
| 6,590,041 B1 | 7/2003 | Eguchi |
| 6,719,555 B2 | 4/2004 | Moore |
| 6,797,200 B2 | 9/2004 | Scelza |
| 6,843,190 B1 | 1/2005 | LaPierre-McAfee |
| 6,852,412 B2 | 2/2005 | Keogh |
| 6,924,243 B2 | 8/2005 | Snyder |
| 7,148,276 B2 | 12/2006 | Bauer et al. |
| 7,378,463 B2 | 5/2008 | Abu-Isa |
| 7,449,508 B2 | 11/2008 | Steib et al. |
| 7,553,898 B2 | 6/2009 | Rafailovich et al. |
| 7,662,474 B2 | 2/2010 | Conesa et al. |
| 7,740,922 B2 | 6/2010 | Ligtemberg et al. |
| 7,851,559 B2 | 12/2010 | Lee |
| 7,862,749 B2 | 1/2011 | Sjerps |
| 7,939,764 B2 | 5/2011 | Gottfried et al. |
| 7,943,722 B2 | 5/2011 | Kim |
| 7,960,450 B2 | 6/2011 | Kawagoshi et al. |
| 8,141,594 B2 | 3/2012 | Shumate et al. |
| 8,178,177 B2 | 5/2012 | Frost et al. |
| 8,227,037 B2 | 7/2012 | Balthes et al. |
| 8,341,820 B2 | 1/2013 | Watson |
| 8,342,211 B2 | 1/2013 | King |
| 8,343,396 B2 | 1/2013 | Tottey et al. |
| 8,343,614 B2 | 1/2013 | Orologio |
| 8,349,925 B2 | 1/2013 | Butz |
| 8,426,015 B2 | 4/2013 | Horisawa et al. |
| 8,443,745 B2 | 5/2013 | Asao et al. |
| 8,470,423 B2 | 6/2013 | Jarvenkyla |
| 8,481,618 B2 | 7/2013 | Harada et al. |
| 8,486,502 B2 | 7/2013 | Jiang et al. |
| 8,555,574 B2 | 10/2013 | Certuse, Jr. |
| 8,875,744 B2 * | 11/2014 | Taagepera ............... F16L 59/06 138/110 |
| 10,825,581 B1 | 11/2020 | Liao et al. |
| 10,975,989 B2 | 4/2021 | Albers |
| 2003/0012908 A1 | 1/2003 | Milhas |
| 2004/0151922 A1 * | 8/2004 | Cohen .................. B32B 37/153 428/458 |
| 2006/0021766 A1 | 2/2006 | Golinveaux |
| 2008/0302544 A1 | 12/2008 | Eskind et al. |
| 2010/0173109 A1 | 7/2010 | Okabe et al. |
| 2010/0266788 A1 * | 10/2010 | Niccolls ............... F16L 58/181 428/447 |
| 2012/0021184 A1 | 1/2012 | Peng et al. |
| 2013/0000868 A1 * | 1/2013 | Taagepera ............... F28D 7/106 165/104.11 |
| 2013/0327436 A1 | 12/2013 | Hein |
| 2015/0285426 A1 | 10/2015 | Shaw |
| 2018/0306352 A1 | 10/2018 | Albers |

* cited by examiner

HIGH TEMPERATURE PROTECTION WRAP FOR PLASTIC PIPES AND PIPE APPLIANCES

CROSS-REFERENCE TO RELATED APPLICATIONS

This application claims the benefit of and priority to U.S. Provisional Patent Appl. No. 63/190,284, filed May 19, 2021, which is hereby incorporated by reference herein in its entirety.

FIELD OF THE INVENTION

The present invention relates to a concentric multi-layer laminated wrap that provides high-performance fire, heat and high temperature protection for plastic pipes and plastic pipe systems, including but not limited to, all forms of polyethylene, polypropylene, and polyvinyl chloride (PVC) pipes, and required system appliances, such as flanges, valves, joints, tees, bends, and the like. The present invention provides fire endurance for up to 60 minutes for up to 2000° F. and reduces or eliminates fire spread and the emission of smoke and toxic products of combustion.

BACKGROUND OF THE INVENTION

Piping systems are used to transport and distribute liquids and gases in nearly all: land-based structures, including residential, commercial, municipal, medical, educational, military, and industrial facilities; marine and transportation vehicles and structures, including boats, ships, submersibles, and offshore facilities; and other transportation systems, including trains and aircraft and their related infrastructure. Nearly all early piping systems and many current piping systems are metal, especially those that require resistance to fire and high heat. Metal pipes, including steel, copper, aluminum, and alloy pipes, are noncombustible, have zero flame spread, and have high fire endurance.

However, metal pipes have numerous disadvantages, including: the high costs associated with procuring and installing them; and their heavy weight, electrical conductivity, rust, and corrosion; and they are conducive to condensation, reactive with chemicals, conduct heat, and susceptible to vibration and rattles (i.e., making loud noises). In addition, connections and modifications of metal pipes require welding or soldering which are labor intensive and, in many instances, degrade over time. In addition, soldering is a contaminant for water systems.

Recently fiberglass and other types of composite fiber reinforced plastic (GRP and more generally FRP, respectively) pipe systems have been used as substitutes for metal pipe systems due to some of their desirable fire protection features. However, FRP pipes have numerous disadvantages including high system cost, high installation costs, heavy weight, and labor-intensive joinery. Furthermore, leaks and failures are common with age and require frequent and expensive maintenance or replacement.

Plastic pipes eliminate many of the associated problems of metal and FRP pipe systems. They are light weight, have lower cost, are nonconductive to electricity or heat, are not susceptible to rust or corrosion, are non-reactive, can withstand high pressures, are not susceptible to vibration or rattle, are relatively easy to install and modify, and have a long-life expectancy with low maintenance.

Plastic pipes across many applications are made with several types of polymers, including polyvinyl chloride (PVC), high density polyethylene (HDPE), and polybutylene (PB).

PVC pipes have many advantages over all metal pipes, including galvanized steel, copper, and aluminum pipes. PVC is the least expensive and most lightweight of plastics. Also, PVC pipes are easier to install than metal pipes, and can withstand high water pressure. However, PVC pipes contain volatile toxic compounds that are harmful to the environment, and at high temperatures they emit highly toxic compounds that are harmful to humans. In addition, PVC pipes cause water to have a plastic taste that is objectionable to many people.

Polyethylene, especially HDPE, is a polymer that is ideal for pipe manufacture. It is environmentally friendly and does not easily swell or dissolve in most common solvents. In addition to having the advantages of other plastic pipes, HDPE pipes offer excellent abrasion resistance, corrosion resistance, high impact resistance, and superior flexibility. HDPE pipes are easy to install and modify and withstand high pressures.

However, despite their many benefits, polyethylene pipes have a higher flame spread potential and a lower ignition temperature as compared to PVC pipes and are not resistant to oxidizing acids, ketones, and chlorinated hydrocarbons. It is specifically the lower fire-resistant properties that make HDPE less attractive for use in residential and commercial applications.

There are numerous applications for piping systems in the marine industry on all types of ships including cruise ships, commercial vessels, workboats, ferries, and tankers, as well as offshore facilities. Applications include ballast systems, freshwater, fire mains, and water spray, seawater, sprinkler systems, and sanitary drains. Despite all the potential advantages of plastic pipe systems they have extremely limited uses in marine applications due to their low fire endurance and failure to comply with marine fire codes.

All systems on international ships including plastic pipes are regulated by the governing authority for marine vessels in international waters: The International Maritime Organization (IMO), a branch of the United Nations. IMO regulations (incorporated by reference herein in their entireties) are drafted and promulgated pursuant to the treaty of the International Convention for the Safety of Life at Sea (SOLAS), which provides the general code for shipboard and offshore applications of equipment. The specific requirements for fire resistance testing and protocols for fire protection for marine vessels, including all onboard systems and components, and for complying with the SOLAS codes are specified by the IMO in the International Code for Application of Fire Test Procedures (FTP Code), incorporated by reference herein in its entirety.

For application aboard marine vessels, all plastic pipes are required to comply with the following relevant standards of the FTP Code, incorporated herein in their entireties:

I. Resolution A653—Recommendation on Improved Fire Test Procedures for Surface Flammability of Bulkhead, Ceiling, and Deck Finish Materials II. Annex 1 Part 2—Smoke and Toxicity Test.

III. Annex 1 Part 5—Surface Flammability Test

In addition to the above requirements, all plastic pipes used for "essential" systems (as defined by the IMO regulations in respect of the SOLAS codes) are required to comply with fire endurance standards as follows:

IV. Resolution A753—Guidelines for the Application of Plastic Pipes on Ships

The requirements include a) demonstration of fire endurance for 30 minutes (Level 2, 3) or 60 minutes (Level 1) exposure to high intensity burners (heat flux density 113.6 kW/m$^2$), and b) demonstration of the ability of the pipe to withstand full pressure (up to 20 Bars) for 30 minutes following the applicable fire exposure.

The above requirements for marine applications, especially fire endurance (item IV), are significantly more severe and comprehensive than for many land-based applications that typically require compliance with a surface flame spread testing criteria, such as American Society for Testing and Materials (ASTM) E84 (incorporated by reference herein in its entirety) or small-scale flame test criteria such as Underwriter's Laboratories (UL) 94 (incorporated by reference herein in its entirety). Certain land-based applications require more significant fire protection (e.g., for up to 3 hours) such as structural steel fire protection according to ASTM E119 or UL 263, which require very thick coatings (typically 3-6 mm) that become brittle upon application. Cracks and delaminations in such coatings are common due to normal building movement and vibration. Acceptance criteria according to the ASTM and UL structural steel fire test standards include maximum temperature rise of the steel at 1000° F. for the test duration. Nevertheless, structural steel fire test criteria are still far less restrictive than the IMO requirements for pipe protection in marine applications, where heat flux density and incident temperature of the exposure is substantially greater and for which the maximum allowable temperature rise of the pipe is less than 270° F.

Therefore, there is a need for a high-performance fire protection system that provides the necessary fire endurance, and the elimination of flame spread, smoke, and toxic products of combustion for plastic pipes in many applications, including marine. The substitution of plastic pipes in applications where metal pipes or FRP pipes are currently used provides numerous performance, cost, and ecological advantages in land based, marine, and transportation applications.

Intumescent coatings have been known for many years and have been used to provide thermal protection for many substrates including wood and wood products, metals, fiberglass, and many types of plastics. However, intumescent coatings used for the protection of these substrates are insufficient to comply with all IMO requirements for the fire and high temperature protection of plastic pipes. Additionally, they do not have the flexibility, durability, and other mechanical properties that are required for practical application on large piping systems. Currently, there is no single fire and high temperature coating or wrap solution for plastic pipes having all the following features:

a. Providing an effective wrap that substantially reduces, or eliminates fire spread and heat release along plastic pipes and complies with IMO A653 (incorporated by reference herein in its entirety).

b. Providing an effective wrap that will ensure fire endurance for plastic pipes up to 60 minutes and complies with IMO A753 (incorporated by reference herein in its entirety).

c. Providing an effective wrap that substantially reduces or eliminates smoke and toxic products of combustion from plastic pipes when exposed directly or indirectly to a fire and complies with FTP Code Annex 1 Part 2 and Part 5 (incorporated by reference herein in its entirety).

d. Providing an effective wrap that is noncombustible and will prevent or eliminate ignition of plastic pipes and complies with ISO (International Organization for Standardization) 1182 (incorporated by reference herein in its entirety).

e. Providing a wrap with superior mechanical properties, including flexibility (as specified by IMO A753), resistant to impact (as specified ISO 3127), and resistant to puncture (as specified by ISO 3127 and EN 1716) that allows easy handling, and wrapping of plastic pipes of varying diameters.

f. Providing a wrap that is thin (less than 3 mm), lightweight (less than 100 ounces per square yard), and easy to install on all types of pipes, and related appliances with complex shapes such as flanges, valves, tees, joints, bends, etc.

g. Providing a durable wrap that resists abrasion and tearing (as specified by IMO A763), impact (as specified by ISO 3127), vibration (as specified by IMO A753-18), moisture (as specified by EN ISO 9142 and ISO 8361), liquid water, salt water (as specified by ISO 9227 NSS IMO A763-18), hydrocarbons and chemicals (as specified by EN ISO 9142), Ultraviolet radiation (as specified by IMO 753-18) and other environmental factors associated with plastic pipe installations.

h. Providing a plastic pipe wrap that is easily manufactured for mass production.

i. Providing a wrap that can be used to provide fire protection to plastic pipe system appliances such as flanges, couplings, valves, tees, elbows, welded joints, butt joints, and the like.

j. Providing a plastic pipe wrap that complies with all the following: does not contain any of toxic substances to environment, marine life, or humans that are prohibited by European Union REACH and CoRAP (incorporated by reference herein in their entireties); Marine Environment Protection Committee Resolution MEPC 179 (59) (incorporated by reference herein in its entirety); and the State of California Protection Agency Act, Prop 65 (incorporated by reference herein in its entirety).

DESCRIPTION OF THE PRIOR ART

Intumescent coatings have been known for many years and have been used to provide thermal protection for many substrates (U.S. Pat. No. 4,879,320 to Hastings, and U.S. Pat. No. 5,723,515 to Gottfried). For example, U.S. Pat. No. 5,723,515 to Gottfried discloses a fire-retardant coating material which is applied to a substrate being iron, steel, stainless steel, aluminum, non-ferrous metals, wood, plywood, chipboard, particle board, orientation strand board, plastics, PVC, thermoplastics, epoxies, neoprene, or rubber.

U.S. Pat. No. 4,251,590 to Rubright discloses a high temperature pipe insulation that is useful to temperatures up to 850° F. and weighs 5-7 lbs/ft. The materials do not provide for protection at high temperature (up to 2000° F.) for long duration (up to 60 minutes) and are far too heavy for practical applications such as in the marine sector. The materials cannot be used effectively to wrap pipes and pipe appliances.

U.S. Pat. No. 4,553,308 to Bosola's discloses a pipe fitting cover and method for covering pipe fittings; however, these covers do not provide for protection at high temperature (up to 2000° F.) for long duration (up to 60 minutes) and are far too bulky and heavy for practical applications such as in the marine sector.

U.S. Pat. No. 5,985,385 to Gottfried discloses a fire and heat protection wrapping system for wrapping conduits, plastic pipe trays, transmission lines, plastic pipes and other electrical transmission devices associated with the transmission of electricity and electrical signals, and gas and oil pipelines. This wrap will not limit the temperature rise of a plastic pipe to 270° F. to comply with IMO A753 level 1, 2, or 3 (incorporated by reference herein in their entireties), and will not provide the necessary protection of a plastic pipe to comply with IMO A653 FTP Code Parts 2 and 5 (incorporated by reference herein in their entireties).

U.S. Pat. No. 6,852,412 to Keogh discloses a fire retardant and thermal insulating wrap for protecting wires and cables with an intumescent coating on a support layer of fiberglass or paper in the preferred embodiment. In an alternate embodiment, the plastic pipe wrap has an additional support layer of a ceramic material, such as mica, foamed polyolefin resin selected from polyethylene, polypropylene, or polypropylene copolymer. The intumescent coating on a support layer does not provide the protection required by IMO A753 including insufficient heat insulation, resistance to ignition, water and chemical resistance, abrasion protection or high temperature protection for 60 minutes. The simple coating of a support layer would require a very thick, heavy layer to provide the necessary fire resistance. Even in the event the coating can withstand the high temperature and high pressure of the IMO A753 fire endurance, this layer will not pass the requirements of IMO A653 Parts 2 and 5 for flame spread, smoke, heat release, and toxicity. Furthermore, the thick coating layer will be inflexible, expensive, difficult to manufacture and install, and to fabricate system components. In the alternate embodiment, with the addition of a layer such as mica, there is additional rigidity, cost, and emission of high levels of toxic products of combustion.

U.S. Pat. No. 7,939,764 to Gottfried, et al. discloses a fire, heat and high voltage cable protection wrap. It will not limit the temperature rise of a plastic pipe to 270° F. to comply with IMO A753 level 1, 2 or 3. The high voltage protection layer will not comply with the requirements of IMO A653 FTP Code Part 2 and 5 (incorporated by reference herein in their entireties). The disclosed material can be wrapped around a cable however it cannot be wrapped around and accommodate compound bends of pipe appliances.

None of the prior art patents/publications disclose high-performance fire, heat and high temperature protection that complies with IMO A753 level 1, 2 or 3 (incorporated by reference herein in their entireties) and IMO A653 FTP Code Parts 2 and 5 (incorporated by reference herein in their entireties) including resistance to ignition, resistance to steam and water submersion, and the flexibility and durability required to wrap plastic pipe appliances.

Therefore, there remains a need for a high-performance fire and high temperature protection laminated wrap that has all the desirable characteristics that complies with IMO A753 level 1, 2 or 3 (incorporated by reference herein in their entireties) and IMO A653 FTP Code Parts 2 and 5 (incorporated by reference herein in their entireties) including resistance to ignition, resistance to steam and water submersion, salt water, and the flexibility and durability required to wrap plastic pipe appliances.

OBJECTS OF THE INVENTION

It is an object of the present invention to provide a high-performance fire, heat and high temperature, concentric, multi-layer laminated wrap that eliminates or substantially reduces fire and flame spread along any contour of a plastic pipe or pipe appliance as specified by IMO A653 FTP Code Part 5.

Another object of the present invention is to provide a high-performance fire, heat and high temperature, concentric, multi-layer laminated wrap that eliminates or substantially reduces smoke and toxic products of combustion from a plastic pipe as specified by IMO A653 FTP Code Part 2.

Another object of the present invention is to provide a high-performance fire, heat and high temperature, concentric, multi-layer laminated wrap that withstands temperatures up to 2000° F. and provides fire endurance for up to 60 minutes for a plastic pipe as specified by IMO A753 Level 1, 2 and 3.

Another object of the present invention is to provide a high-performance fire, heat and high temperature, concentric, multi-layer laminated wrap that is noncombustible (as specified by ISO 1182) and will prevent ignition of plastic pipes.

Another object of the present invention is to provide a high-performance fire, heat and high temperature, concentric, multi-layer laminated wrap that does not adversely affect installation techniques of current plastic pipe wraps or require any retraining of installers.

Another object of the present invention is to provide a high-performance fire, heat and high temperature, concentric, multi-layer laminated wrap that is thin (less than 3 mm), lightweight (less than 100 ounces per square yard), and flexible (flexibility as specified by IMO A753), resistant to impact (as specified by ISO 3127), resistant to puncture (as specified by EN 1716) and allows easy handling and wrapping of plastic pipes, and does not require modification of plastic pipe wrapping techniques, including of varying diameters.

Another object of the present invention is to provide a high-performance fire, heat, and high temperature, concentric, multi-layer laminated wrap that is easily fabricated in a manufacture process and does not substantially alter the appearance of ordinary plastic pipe wraps.

Another object of the present invention is to provide a high-performance fire, heat and high temperature, concentric, multi-layer laminated wrap that is mechanically strong, thin, flexible, and easy to install on all types and sizes of pipes, tees, joints, bends, etc.

Another object of the present invention is to provide a high-performance fire, heat, and high temperature, concentric, multi-layer laminated wrap that is durable and resistant to abrasion (as specified by IMO A753), impact and puncture (as specified by ISO 3127 and EN1716), water (as specified by EN ISO 9142 and ISO 8361), salt water (as specified by EN ISO 9142 and ISO 9227 NSS), chemicals, and hydrocarbons (as specified by EN ISO 9142 (E2)), and all environmental factors including Ultraviolet Radiation (as specified by IMO A753-18) that may be present in plastic pipe installations in marine or land-based applications.

Another object of the present invention is to provide a high-performance fire, heat and high temperature, concentric, multi-layer laminated wrap that substantially reduces, or eliminates, smoke and toxic products of combustion of plastic pipe insulation or ordinary plastic pipe wraps (as specified by IMO A653 FTP Code Part 2), when exposed directly, or indirectly, to a fire.

Another object of the present invention is to provide a high-performance fire, heat and high temperature, concentric, multi-layer laminated wrap that is free from asbestos, halogens, solvents, hydrocarbons or other toxic or environmentally unfriendly composition.

Another object of the present invention is to provide a high-performance fire, heat and high temperature, concentric, multi-layer laminated wrap that can be mass-produced in an automated and economical manner and is cost efficient for application by many users.

Another object of the present invention is to provide a high-performance fire protective coating layer that does not support combustion and is noncombustible according to ISO 1182 (incorporated by reference herein in its entirety).

Another object of the present invention is to provide a high-performance fire protective coating layer that has zero or near zero Rate of Heat Release (RHR) when exposed to radiant heat up to 150 kw/sqm (as tested by a cone calorimeter).

Another object of the present invention is to provide a high-performance fire, heat, and high temperature, concentric, multi-layer laminated wrap that when directly or indirectly exposed to fire or high heat emits zero or near zero smoke or toxic products of combustion (as specified by IMO A653 FTP Code Part 2), Another object of the present invention is to provide coatings that are easy to apply and cure in a manufacturing process, and that can easily be mass-produced on a large scale.

Another object of the present invention is to provide a high-performance fire, heat and high temperature, concentric, multi-layer laminated wrap that is cost effective for application to all plastic pipes installed.

Another object of the present invention is to provide a high-performance fire, heat and high temperature, concentric, multi-layer laminated wrap that can be used to upgrade existing plastic pipe wraps that currently have little or no fire and heat protection, in a very economical manner.

Another object of the present invention is to provide a high-performance fire, heat and high temperature, concentric, multi-layer laminated wrap that can be manufactured and formed to wrap plastic pipe appliances including but not limited to, flanges, couplings, valves, joints, tees, and bends.

Another object of the present invention is to provide a high-performance tire, heat and high temperature, concentric, multi-layer laminated wrap for plastic pipe appliances that can be mass-produced in an automated and economical manner, and that is cost efficient for application by many users.

A further object of the present invention is to provide a high-performance fire, heat and high temperature, concentric, multi-layer laminated wrap for plastic pipe and pipe appliances that complies with all the following and contains no hazardous substances that are toxic to marine life, environment or human life as prohibited by: European Union REACH and CoRAP; Marine Environment Protection Committee Resolution MEPC 179(59); and the State of California Protection Agency Act, Prop 65; (wherein each of the foregoing is incorporated by reference herein in its entirety).

SUMMARY OF THE INVENTION

The present invention relates to a concentric multi-layer laminated wrap that provides high-performance fire, heat and high temperature protection for plastic pipes and pipe appliances comprising: (a) an inner support layer for strength, (b) an intermediate fire protective coating layer and (c) an outer top coating layer that provides resistance to abrasion, impact, and environmental factors including water, salt water, hydrocarbons, chemicals, and gases. The laminated wrap can withstand temperatures up to 2000° F. for a period of 60 minutes. The materials for the inner support layer include but are not limited to: woven or non-woven, knitted, netted, or matted materials such as polyester, nylon, fiberglass, NEXTEL® (high temperature resistant ceramic fibers woven into a textile and manufactured by 3M Company), NOMEX® (an aramid (aromatic polyamide) material manufactured by E. I. Du Pont de Nemours and Company), aramid fibers, carbonized acrylic fibers, metallic strands, cellulose, elastomeric, or polyester films such as cellophane or MYLAR® (also known as BoPET (Biaxially-oriented polyethylene terephthalate), it is a polyester film made from stretched polyethylene terephthalate (PET), and is manufactured by E. I. Du Pont de Nemours and Company). The materials for the intermediate fire protective coating layer are selected from: intumescent coatings including water based, solvent intumescents, epoxy intumescent, fire protective coatings, fire retardant coatings. The material for the outer top coating layer is selected from: metallic films, plastic films, MYLAR® films (MYLAR® is also known as BoPET (Biaxially-oriented polyethylene terephthalate); MYLAR® films are polyester films made from stretched polyethylene terephthalate (PET), and are manufactured by E. I. Du Pont de Nemours and Company), epoxies, polyurethanes, acrylics, alkyds, enamels, elastomerics, polyesters and the like. The laminated wrap provides fire endurance to the plastic pipes or pipe appliances for up to 60 minutes and reduces or eliminates fire spread and the emission of smoke and toxic products of combustion.

In accordance with the present invention, the high-performance fire, heat, and high temperature, concentric, multi-layer laminated wrap complies with flexibility, durability and resistance standards of Marine Classification Societies as provided by the International Code for Application of Fire Test Procedures (FTP Code) of the International Maritime Organization (IMO), (wherein the "FTP Code" and the "IMO" are incorporated by reference herein in their entireties). (All versions of applicable codes and regulations mentioned herein are in effect as of the filing date of the present patent application.)

In accordance with the present invention for a high-performance fire, heat, and high temperature, concentric, multi-layer laminated wrap; the fire protective coating layer provides required fire endurance and low flame spread according to the requirements of ASTM E84, ASTM E162, IMO A653 FTP Code Parts 2 and 5, and IMO A753 level 1, 2, and 3, and is noncombustible according to ISO 1182, (wherein the referenced sections of the "ASTM," "IMO," "FTP," and "ISO" are incorporated by reference herein in their entireties).

In accordance with the present invention, the high-performance fire, heat, and high temperature, concentric, multi-layer laminated wrap has a fire protective coating layer having a thickness in the range of 0.005" to 0.250".

In accordance with the present invention for a high-performance fire, heat, and high temperature, concentric, multi-layer laminated wrap; the fire protective coating layer emits low smoke and low toxic products of combustion according to IMO A653 FTP Code Part 2, IMO A753 and ASTM E662 (wherein the referenced sections of the "ASTM," "IMO," and "FTP" are incorporated by reference herein in their entireties).

In accordance with the present invention, the high-performance fire, heat, and high temperature, concentric, multi-layer laminated wrap weighs less than 100 ounces per square yard.

BRIEF DESCRIPTION OF THE DRAWINGS

Further objects, features, and advantages of the present invention will become apparent upon consideration of the detailed description of the presently preferred embodiments when taken in conjunction with the accompanying drawings wherein.

DETAILED DESCRIPTION OF THE PREFERRED EMBODIMENT

The present invention relates to a concentric, multi-layer laminated wrap that provides high-performance fire, heat and high temperature protection for plastic pipes and pipe appliances comprising a) an inner support layer for strength, b) an intermediate fire protective coating layer and c) an outer top coating layer that provides resistance to abrasion, impact, and environmental factors, including water, salt water, hydrocarbons, chemicals, and gases. The layers of the multi-layer laminated wrap are interchangeable.

Figure 1:
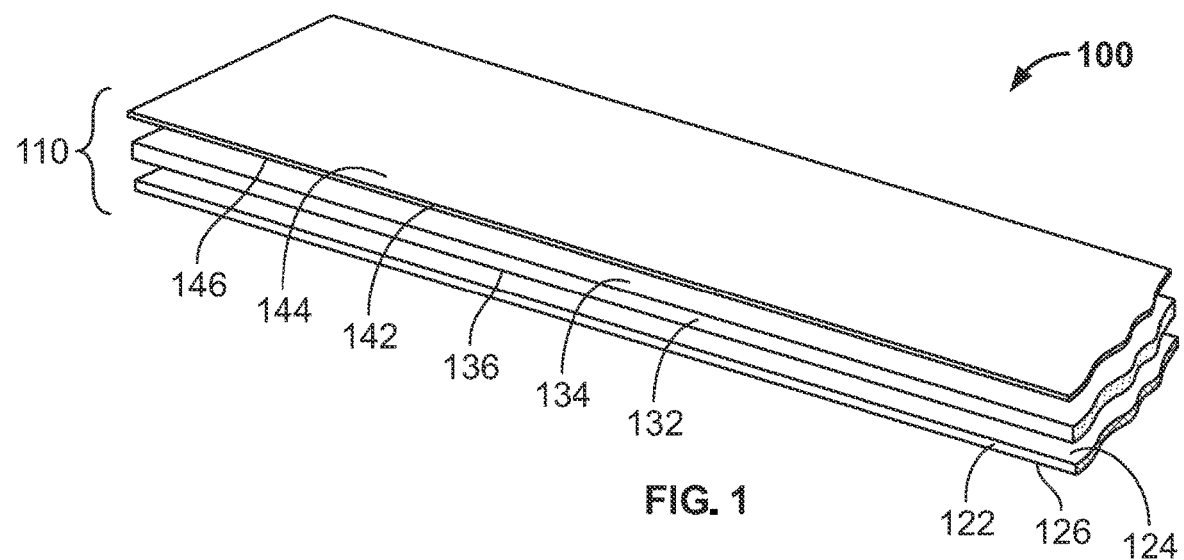
FIG. 1 is an exploded perspective view of a concentric, multi-layer laminated wrap of the preferred embodiment of the present invention showing an inner support layer, an intermediate fire, heat protective coating layer, and an outer top coating layer for forming the laminated wrap in order to protect plastic pipes.

The preferred embodiment of the present invention provides for a high-performance fire, heat, and high temperature, concentric, multi-layer laminated wrap 100 for wrapping plastic pipes and plastic pipe appliances such as tees, bends, and the like, for the transmission of liquids and gases as depicted in detail FIGS. 1 through 6. The concentric multi-layer laminated wrap 100 shown in FIG. 1 is formed from a three-layer, concentric, laminated structure 110 having a plurality of laminate layers comprising an inner layer 122, an intermediate layer 132, and an outer layer 142 for eliminating or substantially reducing fire and flame spread along any contour of a plastic pipe or pipe appliance (as specified by IMO A653 FTP Code Part 5), and for eliminating or reducing the emission of smoke and toxic products of combustion from a plastic pipe or pipe appliance (as specified by IMO A653 FTP Code Part 2). The laminate structure 110 withstands temperatures up to 2000° F. and provides fire endurance for up to 60 minutes (as specified by IMO A753 Level 1, 2 and 3).

As shown in FIG. 1, the inner layer 122 is a support layer selected from: woven or non-woven, knitted, netted, or matted materials such as polyester, nylon, fiberglass, Nextel NEXTEL® (high temperature resistant ceramic fibers woven into a textile and manufactured by 3M Company), NOMEX® (an aramid (aromatic polyamide) material manufactured by E. I. Du Pont de Nemours and Company), aramid fibers, carbonized acrylic fibers, metallic strands, cellulose or polyester films and the like. The intermediate layer 132 is a fire protective coating layer selected from coatings such as an intumescent, including water based intumescents, fire protective coating, fire retardant coating and the like. The fire protective coating provides all the following: a) fire endurance as specified by IMO A753 Level 1, 2, and 3, for up to 60 minutes at temperatures up to 2000° F.; b) flame spread reduction as specified by ASTM E84 Class A and ASTM E162 Class 1; and c) Non combustibility according to ISO 1182. The fire protective coating eliminates flame, ignition and heat release according to IMO A653 FTP Code Part 5, eliminates emission of smoke and toxic products according to IMO A653 FTP Code Part 2 and ASTM E662, (wherein the referenced sections of the "ASTM," "IMO," "FTP," and "ISO" are incorporated by reference herein in their entireties), and has a Rate of Heat Release (RHR) near zero at radiant exposure up to 150 kW/square meter (as tested by a cone calorimeter). (A cone calorimeter is a known, commonly used laboratory device or instrument for testing, measuring, and providing quantitative data for the flammability, combustion, and smoke generation of materials under a wide range of conditions, including, for example, under constant external heat flux.)

Further, the fire protective coating is flexible as specified by IMO A753, durable and impact resistant (as specified by ISO 3127 and EN 1716), and long lasting as required by Marine Class Societies and nontoxic and environmentally safe (containing no hazardous components that are toxic to marine life, environment, or human life) according to: a) European Union REACH and CoRAP; b) Marine Environment Protection Committee Resolution MEPC 179(59); and c) State of California Protection Agency Act Prop 65, (wherein the relevant sections of "REACH," "CoRAP," "MEPC 179(59)," and "Prop 65" are incorporated by reference herein in their entireties).

The fire protection coating is lightweight, weighing less than 100 ounces/square yard, and has a thickness up to 0.25 inches. Preferably, the fire protection weighs less than 45 ounces/square yard, and has a thickness up to 0.25 inches.

The outer layer 142 is a topcoat layer for durability (as specified by ISO 3127 and EN 1716) and resistance to environmental factors such as water (as specified by EN ISO 9142 and ISO 8361), and salt water (as specified by EN ISO 9142 and ISO 9227 NSS), hydrocarbons, chemicals, gases (as specified by EN ISO 9142), and comprised of material such as epoxy, polyurethane, acrylics, alkyds, enamels, elastomerics, polyesters, polyurethanes, metals, metallic films, and the like.

The concentric composite laminate structure 110 is assembled in the following manner: The first surface 124 of the inner layer 122 is adjacent to and in contact with the second surface 136 of the fire protective coating layer 132. The first surface 134 of the fire protective coating layer 132 is adjacent to and in contact with the second surface 146 of the protective topcoat layer 142, as shown in FIG. 1 of the drawings, which when laminated by heat and pressure forms the concentric, composite, laminated structure 110 of the high-performance fire, heat, and high temperature, concentric, multi-layer laminated wrap 100.

Figure 2:
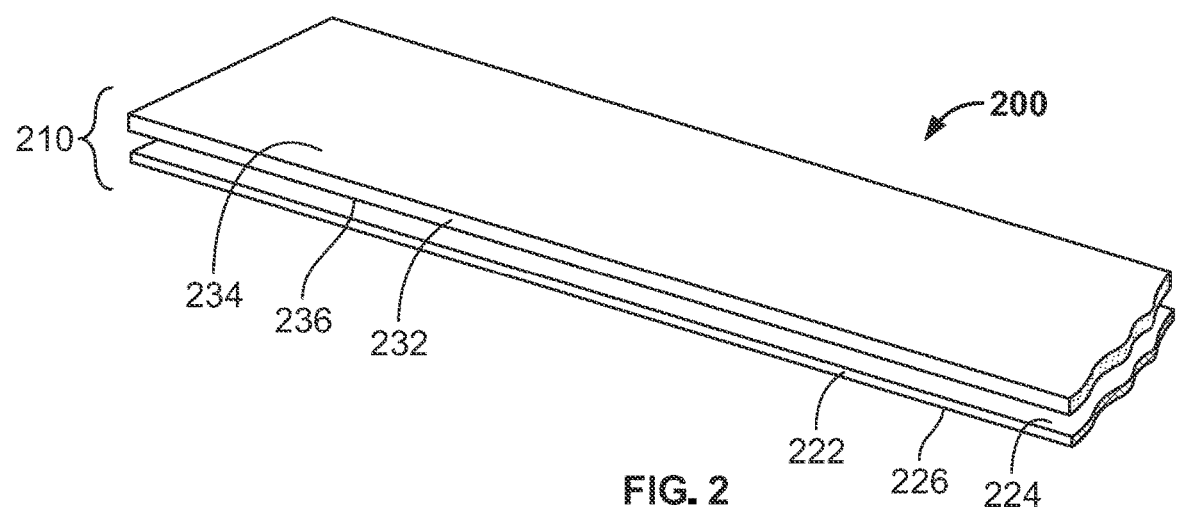
FIG. 2 is an exploded perspective view of a concentric, two-layer wrap of an alternate embodiment of the present invention showing an inner support layer and an outer tire, heat, and temperature protective coating layer for forming the laminated wrap in order to protect plastic pipes.

The first alternate embodiment of the present invention provides for a high-performance fire, heat, and high temperature concentric two-layer wrap 200 for the application to plastic pipes and plastic pipe appliances such as tees, bends, and the like, for the transmission of liquids and gases as depicted in detail FIG. 2. The high-performance fire, heat, and high temperature, concentric, two-layer wrap 200 is formed from a two-layer concentric structure 210 having two applied layers 222 and 232 for eliminating or substantially reducing fire and flame spread along any contour of a plastic pipe or pipe appliance (as specified by IMO A653 FTP Code Part 5), and the emission of smoke and toxic products of combustion from a plastic pipe or pipe appliance (as specified by IMO A653 FTP Code Part 2). The applied structure 210 withstands temperatures up to 2000° F. and provides fire endurance for up to 60 minutes (as specified by A753 Level 1, 2 and 3).

As shown in FIG. 2, the two-layer concentric structure 210 includes an inner layer 222 having a first surface 224 and a second surface 226 for providing support and strength; and an outer layer 232 having a first surface 234 and a second surface 236 for providing fire and heat insulation. The inner layer 222 is a support layer selected from woven or non-woven, knitted, netted, or matted materials such as polyester, nylon, fiberglass, Nextel NEXTEL® (high temperature resistant ceramic fibers woven into a textile and manufactured by 3M Company), NOMEX® (an aramid (aromatic polyamide) material manufactured by E. I. Du Pont de Nemours and Company), aramid fibers, carbonized acrylic fibers, metallic strands, cellulose or polyester films and the like. The outer layer 232 is a fire protective coating layer selected from coatings such as an intumescent, including water based intumescents, fire protective coating, fire retardant coating and the like.

The fire protective coating layer provides all the following: a) fire endurance as specified by IMO A753 Level 1, 2, and 3, for up to 60 minutes at temperatures up to 2000° F.; b) flame spread reduction as specified by ASTM E84 Class A and ASTM E162 Class 1; and c) Non combustibility according to ISO 1182. The fire protective coating eliminates flame, ignition and heat release according to IMO A653 FTP Code Part 5, eliminates emission of smoke and toxic products according to IMO A653 FTP Code Part 2 and ASTM E662, (wherein the referenced sections of the "ASTM," "IMO," "FTP," and "ISO" are incorporated by reference herein in their entireties), and has a Rate of Heat Release (RHR) near zero at radiant exposure up to 150 kW/square meter.

Further, the fire protective coating layer is flexible (as specified by IMO A753), durable (as specified by ISO 3127 and EN 1716), impact resistant (as specified by ISO 3127), and long lasting as required by Marine Class Societies and nontoxic and environmentally safe (does not contain any components hazardous to marine life, environment, or human life) according to: a) European Union REACH and CoRAP; b) Marine Environment Protection Committee Resolution MEPC 179(59); and c) State of California Protection Agency Act Prop 65, (wherein the relevant sections of "REACH," "CoRAP," "MEPC 179(59)," and "Prop 65" are incorporated by reference herein in their entireties). The fire protection coating is lightweight, weighing less than 100 ounces/square yard, and has a thickness up to 0.25 inches. Preferably, the fire protection weighs less than 45 ounces/square yard, and has a thickness up to 0.25 inches. The concentric composite structure 210 is assembled in the following manner: The first surface 224 of the support layer 222 is adjacent to and in contact with the second surface 236 of the fire and heat insulation layer 232 as shown in FIG. 2 of the drawings, which when applied forms the concentric composite structure 210 of the high-performance fire, heat, and high temperature concentric two-layer wrap 200.

The concentric, composite structure 210 can be used to upgrade existing wraps or coatings to provide the high-performance fire and high heat protection.

Figure 3:
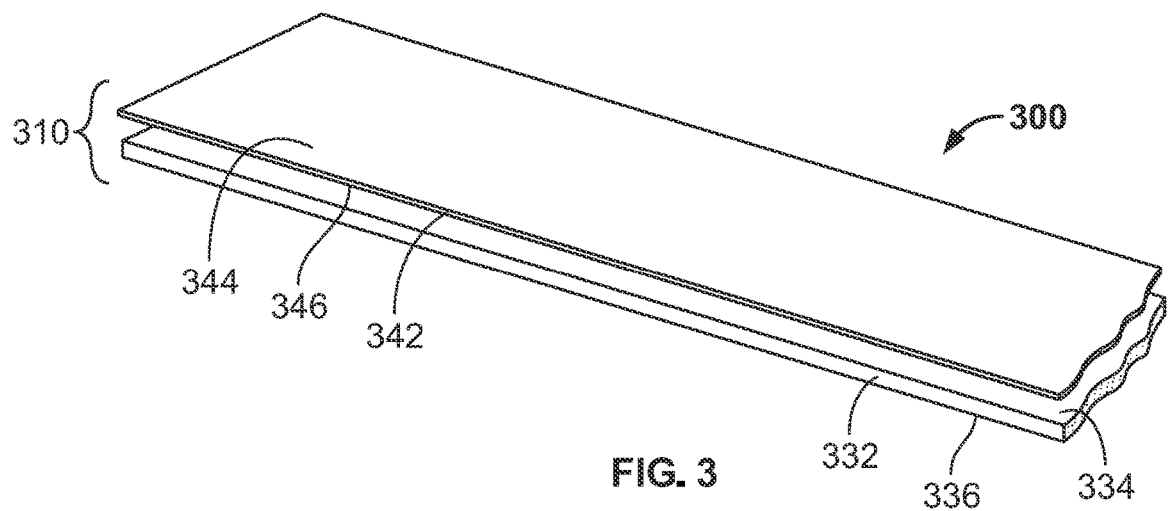
FIG. 3 is an exploded perspective view of a concentric, two-layer coating of an alternate embodiment of the present invention showing an inner fire, heat and temperature protective coating layer and an outer top coating layer for forming the laminated wrap in order to protect plastic pipes.

The second alternate embodiment of the present invention provides for a high-performance fire, heat, and high temperature, concentric, two-layer coating 300 for the application to plastic pipes and plastic pipe appliances such as tees, bends, and the like, for the transmission of liquids and gases as depicted in detail FIG. 3. The high performance fire, heat, and high temperature, concentric, two-layer coating 300 is formed from a two-layer concentric structure 310 having two applied layers 332 and 342 for eliminating or substantially reducing: fire and flame spread along any contour of a plastic pipe or pipe appliance (as specified by IMO A653 FTP Code Part 5), and also the emission of smoke and toxic products of combustion from a plastic pipe or pipe appliance (as specified by IMO A653 FTP Code Part 2). The applied structure 310 withstands temperatures up to 2000° F. and provides fire endurance for up to 60 minutes (as specified by IMO A753 Level 1, 2 and 3).

As shown in FIG. 3, the two-layer concentric structure 310 includes an inner layer 332 having a first surface 334 and a second surface 336 for providing fire and heat insulation; an outer layer 342 having a first surface 344 and a second surface 346 for providing a protective topcoat outer layer that provides durability and resistance to abrasion (as specified by IMO A753), impact (as specified by ISO 3127 and EN 1716), water (as specified by EN ISO 9142 and ISO 8361), and salt water (as specified by EN ISO 9142 and ISO 9227 NSS), chemicals, hydrocarbons (as specified by EN ISO 9142) and all environmental factors including Ultraviolet Radiation that may be present in plastic pipe installations in marine or land-based applications. The inner layer 332 is a fire protective coating layer selected from coatings such as an intumescent, fire protective coating, fire retardant coating and the like. The outer layer 342 is a topcoat layer for durability and resistance to environmental factors such as water, salt water, hydrocarbons, chemicals, gases, and comprised of material such as epoxy, polyurethane, acrylics, alkyds, enamels, elastomerics, polyesters, polyurethanes, metals, metallic films, and the like.

The concentric composite structure 310 is assembled in the following manner: The first surface 334 of the fire protective coating layer 332 is adjacent to and in contact with the second surface 346 of the topcoat layer 342 as shown in FIG. 3 of the drawings, which when applied forms the concentric composite structure 310 of the high performance fire, heat, and high temperature, concentric, two-layer coating 300.

The fire protective coating provides all the following: a) fire endurance as specified by IMO A753 Level 1, 2, and 3, for up to 60 minutes at temperatures up to 2000° F.; b) flame spread reduction as specified by ASTM E84 Class A and ASTM E162 Class 1; and c) Non combustibility according to ISO 1182. The fire protective coating eliminates flame, ignition, and heat release according to IMO A653 FTP Code Part 5, eliminates emission of smoke and toxic products according to IMO A653 FTP Code Part 2 and ASTM E662, (wherein the referenced sections of the "ASTM," "IMO," "FTP," and "ISO" are incorporated by reference herein in their entireties), and has a Rate of Heat Release (RHR) near zero at radiant exposure up to 150 kW/square meter as tested by a cone calorimeter.

Further, the fire protective coating is flexible (as specified by IMO A753), durable and impact resistant (as specified by ISO 3127 and EN 1716), and long lasting as required by Marine Class Societies and nontoxic and environmentally safe (does not contain any substances that are classed as hazardous to marine life, environment, and human life) according to: a) European Union REACH and CoRAP; b) Marine Environment Protection Committee Resolution MEPC 179(59); and c) State of California Protection Agency Act Prop 65, (wherein the relevant sections of "REACH," "CoRAP," "MEPC 179(59)," and "Prop 65" are incorporated by reference herein in their entireties). The fire protection coating is lightweight, weighing less than 100 ounces/square yard, and has a thickness up to 0.25 inches. Preferably, the fire protection weighs less than 45 ounces/square yard, and has a thickness up to 0.25 inches.

Figure 4:
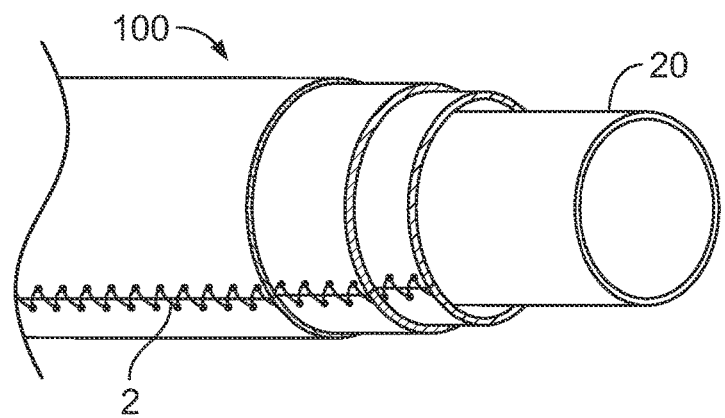
FIG. 4 is a perspective view of a concentric, multi-layer laminated wrap for a plastic pipe.

A pipe 20 wrapped with the preferred embodiment of the present invention is shown in FIG. 4. The pipe 20 is wrapped with the high-performance fire, heat, and high temperature, concentric, multi-layer laminated wrap 100. The seam 2 is an overlap that is double stitched with noncombustible fiberglass or stainless steel.

Figure 5:
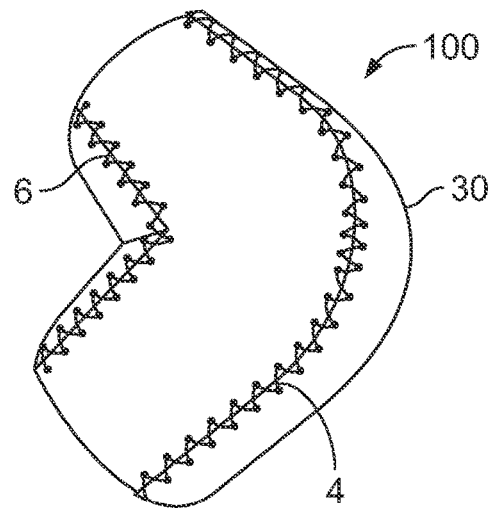
FIG. 5 is a perspective view of a concentric, multi-layer laminated wrap for a pipe bend.

A pipe bend 30 wrapped with the preferred embodiment of the present invention is shown in FIG. 5. The high-performance fire, heat, and high temperature, concentric, multi-layer laminated wrap 100 easily accommodates the compound bends and shapes of the pipe appliances. The seams 4 and 6 are sewn using fiberglass or stainless-steel thread.

Figure 6:
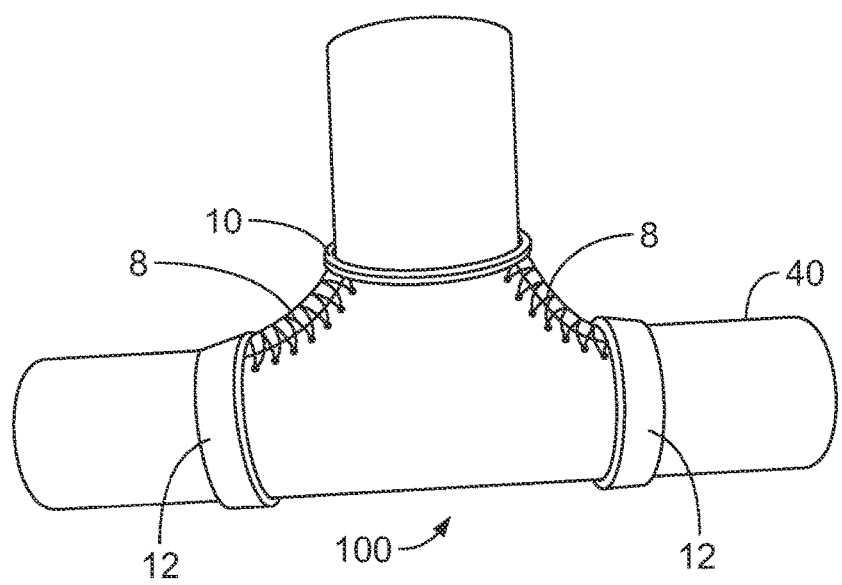
FIG. 6 is a perspective view of a concentric, multi-layer laminated wrap for a pipe tee.

A pipe tee 40 wrapped with the preferred embodiment of the present invention is shown in FIG. 6. The high-performance fire, heat, and high temperature, concentric, multi-layer laminated wrap 100 accommodates the contour shape of the pipe tee. Seam 8 is sewn using fiberglass or stainless steel thread. Stainless steel band 10 provides support for the wrap on contour. Stainless steel lugs 12 are mounted to the wrap and secured using stainless steel thread.

Examples of the Use of High-Performance Fire, Heat and High Temperature Concentric Laminated Wrap/Coating Example 1

The high-performance fire, heat, and high temperature concentric three-layer laminated wrap 100 is formed of: (a) an inner support layer comprising woven fiberglass weighing 48 oz/yd$^2$, and (b) an intermediate fire protection coating layer comprising modified A18 (referred to as A18G) water based fire retardant intumescent weighing 42 oz/yd$^2$, manufactured by No Fire Technologies, Inc., and (c) an outer layer of Thermoplastic Polyurethane (TPU).

The concentric three-layer laminated wrap 100 is used to protect a 110 mm diameter polyethylene (HDPE) pipe and tested according to the requirements of IMO A753 Level 3 as provided in the FTP Code. The test is conducted at an independent laboratory, RISE Research Institute of Sweden. The conclusion after testing is that the protected pipe is deemed to comply with the requirements of IMO A753 Level 3.

The plastic pipe is tested according to the requirements of IMO A653 FTP Code Part 5.

Table 1 shows the requirements of the standard (acceptance criteria) and the test results:

TABLE 1

| Test | Requirement | Test Results |
|---|---|---|
| Critical Flux at Extinguishment | >20.0 kW/m$^2$ | 22.7 kW/m$^2$ |
| Heat for Sustained Burning | >1.5 MJ/m$^2$ | 1.72 MJ/m$^2$ |
| Total Heat Release | <0.7 MJ | 0.52 MJ |
| Peak Heat Release Rate | <4.0 kW | 1.26 kW |
| Production of Burning Droplets | 0 | 0 |

The pipe wrap is determined to be in compliance with the standard.

Example 2

The high-performance fire, heat, and high temperature concentric two-layer wrap 200 is formed of: (a) an inner support layer comprising woven fiberglass weighing 35 oz/yd$^2$, and (b) an outer fire protection coating layer comprising modified A18 water based fire retardant intumescent (referred to as A18G), manufactured by No Fire Technologies, Inc.

The concentric two-layer wrap 200 is used to protect a 110 mm Diameter polyethylene (HDPE) pipe and tested according to the requirements of IMO A753 Level 3 as provided in the FTP Code. The test is conducted at an independent laboratory, Intertek Testing Services, Elmendorf, Tex. The conclusion after testing is that the protected pipe is deemed to comply with the requirements of IMO A753 Level 3.

The plastic pipe is tested according to the requirements of IMO A653 FTP Code Part 5.

Table 2 shows the requirements of the standard (acceptance criteria) and the test results:

TABLE 2

| Test | Requirement | Test Results |
|---|---|---|
| Critical Flux at Extinguishment | >20.0 kW/m$^2$ | >47.2 kW/m$^2$ |
| Heat for Sustained Burning | >1.5 MJ/m$^2$ | >30 MJ/m$^2$ |
| Total Heat Release | <0.7 MJ | 0.0 MJ |
| Peak Heat Release Rate | <4.0 kW | 0.6 kW |
| Production of Burning Droplets | 0 | 0 |

The wrap on the pipe is determined to be in compliance with the standard.

Example 3

The concentric two-layer wrap 200 around plastic pipe of Example 2 is tested according to Annex 1 Part 2 of the FTP Code—Smoke and Toxicity Test, conducted at exposures 25 kW/m$^2$ and 50 kW/m$^2$. The Maximum levels required for compliance and the Measured Levels are provided below:

Table 3 shows the test results of Smoke and Toxicity Test, conducted at exposures 25 kW/m$^2$ and 50 kW/m$^2$.

| Criteria | Maximum | Measured |
|---|---|---|
| Maximum smoke density in any condition | 400 | 47 |
| Maximum gas concentrations (ppm): | | |
| Carbon Monoxide | 1450 | 190 |
| Oxides of Nitrogen | 350 | 0 |
| Sulfur Dioxide | 120 | 0 |
| Hydrogen Chloride | 600 | 0 |
| Hydrogen Fluoride | 600 | 0 |
| Hydrogen Bromide | 600 | 0 |
| Hydrogen Cyanide | 140 | 73 |

Operation

The fire, heat, and high temperature, concentric, multi-layer laminated wrap of the present invention is used to wrap individual plastic pipes and pipe appliances for any current installation. The laminated wrap can be installed in the manufacturing plant by sliding it onto the pipe. Alternatively, the laminated wrap can be installed on existing pipes by wrapping the cloth around the pipe and securing it. The laminated wrap can be cut to any pattern and formed around any complex contour of a pipe appliance. The laminated wrap is secured using bands or ties made of noncombustible material such as stainless steel or fiberglass.

Advantages of the Present Invention

It is an advantage of the present invention to provide a high-performance fire, heat and high temperature, concentric, multi-layer laminated wrap that eliminates or substantially reduces fire and flame spread along any contour of a plastic pipe or pipe appliance.

Another advantage of the present invention is to provide a high-performance fire, heat and high temperature, concentric, multi-layer laminated wrap that eliminates or substantially reduces smoke and toxic products of combustion from a plastic pipe as specified by IMO A653 FT Code Part 2.

Another advantage of the present invention is to provide a high-performance fire, heat and high temperature, concentric, multi-layer laminated wrap that withstands temperatures up to 2000° F. and provides fire endurance (as specified by IMO A753 Level 1, 2 and 3) for up to 60 minutes for a plastic pipe.

Another advantage of the present invention is to provide a high-performance fire, heat and high temperature, concentric, multi-layer laminated wrap that is thin, lightweight, and flexible and allows easy handling and wrapping of plastic pipes and does not require modification of plastic pipe wrapping techniques including of varying diameters.

Another advantage of the present invention is to provide a high-performance fire, heat and high temperature, concentric, multi-layer laminated wrap that is mechanically strong, thin, flexible, and easy to install on all types and sizes of pipes, tees, joints, bends, etc.

Another advantage of the present invention is to provide a high-performance fire protective coating layer that has zero or near zero Rate of Heat Release (RHR) when exposed to radiant heat up to 150 kw/sqm.

Another advantage of the present invention is to provide a high-performance fire, heat and high temperature, concentric, multi-layer laminated wrap for plastic pipe and pipe appliances that complies with all the following: European Union REACH and CoRAP; Marine Environment Protection Committee Resolution MEPC 179(59); and State of California Protection Agency Act, Prop 65.

A further advantage of the present invention is to provide a high-performance fire, heat and high temperature, concentric, multi-layer laminated wrap for plastic pipe and pipe appliances that complies with all the following: requirements of ASTM E84 Class A, ASTM E162 Class 1, IMO A653, and IMO A753 level 1, 2 and 3, FTP Code Part 5, ISO 1182, FTP Code Part 2, ASTM E662. ISO 3127, EN 1716, EN ISO 9142, ISO 8361, ISO 9227 and NSS).

What is claimed is:
1. A concentric, multi-layer laminated wrap for protecting plastic pipes from fire, heat, and high temperature comprising:
   a) an inner layer;
   b) an intermediate layer; and
   c) an outer layer;
   d) wherein said inner layer is a support layer for strength;
   e) wherein materials for forming said support layer for strength are selected from the group comprising: woven, non-woven, knitted, netted or matted materials, polyester, nylon, fiberglass, woven ceramic fabric, aromatic polyamide material, aramid fibers, carbon fibers, carbonized acrylic fibers, metallic strands, cellulose, elastomeric or polyester films, cellophane films, biaxially-oriented polyethylene terephthalate (BOPET) polyester films, and combinations thereof;
   f) wherein said intermediate layer is a fire protective coating layer;
   g) wherein materials for forming said fire protective coating layer are selected from the group comprising: intumescent coatings, including water based, solvent intumescents, epoxy intumescents, fire protective coatings, fire retardant coatings, and combinations thereof;
   h) wherein said outer layer is a top coating layer for providing resistance to water, salt water, hydrocarbons, chemicals, gases, environmental factors and mechanical damage;
   i) wherein materials for forming said top coating layer are selected from the group comprising: metallic films, plastic films, epoxies, polyurethanes, acrylics, alkyds, enamels, elastomerics, polyesters, biaxially-oriented polyethylene terephthalate (BOPET) polyester films, and combinations thereof;
   j) wherein said multi-layer laminated wrap is configured by laminating the inner layer, the intermediate layer, and the outer layer;
   k) wherein said multi-layer laminated wrap is wrapped around said plastic pipes to protect the plastic pipes by providing fire endurance for up to 60 minutes at temperatures up to 2000° F. as specified by IMO A753 Level 1, 2, and 3 (1993), and to reduce or eliminate fire spread, ignition and heat release as specified by IMO A653 FTP Code Part 5 (2010), and reduce emission of smoke and toxic products of combustion as specified by IMO A653 FTP Code Part 2 (2010);
   l) wherein said multi-layer laminated wrap is wrapped around said plastic pipes providing flexibility as specified by IMO A753, durable and impact resistance as specified by ISO 3127 (2017) and EN 1716 (2018), and long lasting as required by Marine Class Societies and nontoxic and environmentally safe containing no hazardous components that are toxic to marine life, environment, or human life according to: i) European Union REACH (2022) and CoRAP (2022);
   ii) Marine Environment Protection Committee Resolution MEPC 179(59) (2009); and iii) State of California Protection Agency Act Prop 65 (1986); and
   m) wherein said multi-layer laminated wrap is wrapped around said plastic pipes providing durability as specified by ISO 3127 and EN 1716 and resistance to the environmental factors such as water as specified by EN ISO 9142 (2003) and ISO 8361 (1991), and salt water as specified by EN ISO 9142 and ISO 9227 NSS (2017), hydrocarbons, chemicals, and gases as specified by EN ISO 9142 including Ultraviolet Radiation as specified by IMO A753-18 (1993).

2. The concentric, multi-layer laminated wrap for protecting plastic pipes from fire, heat, and high temperature in accordance with claim 1,
   a) wherein said multi-layer laminated wrap is wrapped around said plastic pipes providing flexibility as specified by IMO A753 (1993), durable and impact resistance as specified by ISO 3127 (2017) and EN 1716 (2018), and long lasting as required by Marine Class Societies, including Det Norske Veritas (DNV) and Lloyd's Register, and the FTP Code of the IMO (2010), and nontoxic and environmentally safe containing no hazardous components that are toxic to marine life, environment, or human life according to: i) European Union REACH (2022) and CoRAP (2022); ii) Marine Environment Protection Committee Resolution MEPC 179(59) (2009); and iii) State of California Protection Agency Act Prop 65 (1986); and b) wherein said multi-layer laminated wrap is wrapped around said plastic pipes providing durability as specified by ISO 3127 and EN 1716 and resistance to environmental factors such as water as specified by EN ISO 9142 (2003) and ISO 8361 (1991), and salt water as specified by EN ISO 9142 and ISO 9227 NSS (2017), hydrocarbons, chemicals, and gases as specified by EN ISO 9142 including Ultraviolet Radiation as specified by IMO A753-18 (1993).

3. The concentric, multi-layer laminated wrap for protecting plastic pipes from fire, heat, and high temperature in accordance with claim 1, wherein said laminated wrap weighs less than 100 ounces per square yard; and wherein said laminated wrap can be easily cut to any desired pattern and formed to protect plastic pipe appliances that includes flanges, couplings, valves, joints, tees, and bends.

4. The concentric multi-layer laminated wrap for protecting plastic pipes from fire, heat, and high temperature in accordance with claim 1, wherein said plastic pipes and said plastic pipe appliances include all forms of plastic pipes including, but not limited to, polyethylene, polypropylene, and polyvinyl chloride (PVC).

5. The concentric multi-layer laminated wrap for protecting plastic pipes from fire, heat, and high temperature in accordance with claim 1, wherein said fire protective coating layer has a thickness in the range of 0.005" to 0.250", and has zero or near zero rate of heat release (RHR) when exposed to radiant heat up to 150 kw/sqm as tested by a cone calorimeter.

6. The concentric, multi-layer laminated wrap for protecting plastic pipes from fire, beat, and high temperature in accordance with claim 1, wherein said fire protective coating layer provides required fire endurance and low flame spread according to the requirements of ASTM E84 Class A (2022), ASTM E162 Class 1 (2022), IMO A 653 (1989), and IMO A 753 Level 1, 2 and 3 (1993), FTP Code Part 5 (2010), and is noncombustible according to ISO 1182 (2020); and wherein said fire protective coating layer emits low smoke and low toxic products of combustion according to IMO A653, IMO A753, FTP Code Part 2 (2010), and ASTM E662 (2021).

7. A concentric two-layer wrap for protecting plastic pipes from fire, heat, and high temperature comprising:

a) an inner layer; and
b) an outer layer;
c) wherein said inner layer is a support layer for strength;
d) wherein materials for forming said support layer for strength are selected from the group comprising: woven, non-woven, knitted, netted or matted materials, polyester, nylon, fiberglass, woven ceramic fabric, aromatic polyamide material, aramid fibers, carbon fibers, carbonized acrylic fibers, metallic strands, cellulose, elastomeric or polyester films, cellophane films, biaxially-oriented polyethylene terephthalate (BOPET) polyester films, and combinations thereof;
e) wherein said outer layer is a fire protective coating layer;
f) wherein materials for forming said fire protective coating layer are selected from the group comprising: intumescent coatings, including water based, solvent intumescents, epoxy intumescents, fire protective coatings, fire retardant coatings and combinations thereof;
g) wherein said two-layer wrap is configured by applying the inner layer, and the outer layer;
h) wherein said wrap is wrapped around said plastic pipes to protect the plastic pipes by providing fire endurance for up to 60 minutes at temperatures up to 2000° F. as defined by IMO A753 Level 1, 2 and 3 (1993), and to further reduce or eliminate fire spread ignition and heat release as specified by IMO A653 FTP Code Part 5 (2010), and reduce emission of smoke and toxic products of combustion as specified by IMO A653 FTP Code Part 2 (2010);
i) wherein said wrap is wrapped around said plastic pipes providing flexibility as specified by IMO A753(1993), durable and impact resistance as specified by ISO 3127 (2017) and EN 1716 (2018), and long lasting as required by Marine Class Societies, including DNV and Lloyd's Register, and the FTP Code (2010), and nontoxic and environmentally safe containing no hazardous components that are toxic to marine life, environment, or human life according to: i) European Union REACH (2022) and CoRAP (2022); ii) Marine Environment Protection Committee Resolution MEPC 179(59) (2009); and iii) State of California Protection Agency Act Prop 65 (1986); and
j) wherein said wrap is wrapped around said plastic pipes providing durability as specified by ISO 3127 and EN 1716 and resistance to environmental factors such as water as specified by EN ISO 9142 (2003) and ISO 8361 (1991), and salt water as specified by EN ISO 9142 and ISO 9227 NSS (2017), hydrocarbons, chemicals, and gases as specified by EN ISO 9142 including Ultraviolet Radiation as specified by IMO A753-18 (1993).

8. The concentric two-layer wrap for protecting plastic pipes from fire, heat, and high temperature in accordance with claim 7, wherein said fire protective coating layer has required fire endurance and low flame spread according to the requirements of ASTM E84 Class A (2022), ASTM E1 62 Class 1 (2022), IMO A653 (1989), and IMO A753 Level 1, 2 and 3 (1993), FTP Code Part 5 (2010), and is noncombustible according to ISO 1182 (2020); and wherein said fire protective coating layer emits low smoke and low toxic products of combustion according to IMO A653, IMO A753 (1993), FTP Code Part 2 (2010), and ASTM E662 (2021).

9. The concentric two-layer wrap for protecting plastic pipes from fire, heat, and high temperature in accordance with claim 7, wherein said wrap has thickness in the range of 0.005" to 0.250"; and wherein said wrap can be easily cut in any desired pattern and applied to protect plastic pipe appliances that include: flanges, couplings, valves, joints, tees, and bends.

10. A concentric two-layer coating for protecting plastic pipes from fire, heat, and high temperature comprising:

a) an inner layer; and
b) an outer layer;
c) wherein said inner layer is a fire protective coating layer;
d) wherein materials for forming said fire protective coating layer are selected from the group comprising: intumescent coatings, including water based, solvent intumescents, epoxy intumescents, fire protective coatings, fire retardant coatings, and combinations thereof;

e) wherein said outer layer is a top coating layer;

f) wherein materials for forming said top coating layer are selected from the group comprising: metallic films, plastic films, epoxies, polyurethanes, acrylics, alkyds, enamels, elastomerics, polyesters, biaxially-oriented polyethylene terephthalate (BOPET) polyester films, and combinations thereof;

g) wherein said two-layer coating is configured by applying the inner layer, and the outer layer;

h) wherein said two-layer coating is applied to said plastic pipes to protect the plastic pipes by providing fire endurance for up to 60 minutes at temperatures up to 2000° F. as specified by IMO A753 Level 1, 2, and 3 (1993), and to further reduce or eliminate fire spread, ignition and heat release as specified by IMO A653 FTP Code Part 5 (2010), and reduce emission of smoke and toxic products of combustion as defined by IMO A653 FTP Code Part 2 (2010);

i) wherein said two-layer coating is applied to said plastic pipes providing flexibility as specified by IMO A753 (1993), durable and impact resistance as specified by ISO 3127 (2017) and EN 1716 (2018), and long lasting as required by Marine Class Societies, including DNV and Lloyd's Register and the FTP Code (2010), and nontoxic and environmentally safe containing no hazardous components that are toxic to marine life, environment, or human life according to: i) European Union REACH (2022) and CoRAP (2022); ii) Marine Environment Protection Committee Resolution MEPC 179(59) (2009); and iii) State of California Protection Agency Act Prop 65 (1986); and j) wherein said two-layer coating is applied to said plastic pipes providing durability as specified by ISO 3127 and EN 1716 and resistance to environmental factors such as water as specified by EN ISO 9142 (2003) and ISO 8361 (1991), and salt water as specified by EN ISO 9142 and ISO 9227 NSS (2017), hydrocarbons, chemicals, and gases as specified by EN ISO 9142 including Ultraviolet Radiation as specified by IMO A753-18 (1993).

11. The concentric two-layer coating for protecting plastic pipes from fire, heat, and high temperature in accordance with claim 10, wherein said fire protective coating layer has required fire endurance and low flame spread according to the requirements of ASTM E84 Class A (2022), ASTM E162 Class 1 (2022), IMO A653 (1989), and IMO A753 Level 1, 2 and 3 (1993), FTP Code Part 5 (2010), and is noncombustible according to ISO 1182 (2020); and wherein said fire protective coating layer emits low smoke and low toxic products of combustion according to IMO A653 (1989), IMO A753 (1993), FTP Code Part 2 (2010), and ASTM E662 (2021).

12. The concentric two-layer coating for protecting plastic pipes from fire, heat, and high temperature in accordance with claim 10, wherein said two-layer coating has thickness in the range of 0.005" to 0.250"; and lightweight, weighing less than 45 ounces per square yard; and wherein said two-layer coating can be easily applied in any desired pattern and applied to protect plastic pipe appliances that include: flanges, couplings, valves, joints, tees, and bends.

* * * * *